UNITED STATES PATENT OFFICE.

HEINRICH HEIMANN, OF DESSAU, GERMANY, ASSIGNOR TO ACTIEN GESELLSCHAFT FÜR ANILIN FABRIKATION, OF BERLIN, GERMANY.

SULFURIZED DYES AND PROCESS OF MAKING SAME.

1,105,515.  Specification of Letters Patent.  Patented July 28, 1914.

No Drawing.  Application filed October 16, 1912. Serial No. 726,124.

*To all whom it may concern:*

Be it known that I, HEINRICH HEIMANN, a citizen of the German Empire, residing at Dessau, Germany, my post-office address being Friedrich-Schneiderstrasse 63, Dessau, Germany, have invented new and useful Improvements in new Sulfurized Dyes and Processes of Making Same, of which the following is a specification.

In a co-pending application, serially numbered 726,121, I describe and claim generally new sulfurized dyes fast to washing and to chlorin which can be obtained by acting with a sulfurizing agent upon a 4-hydroxydiarylamin in which only the 4-hydroxyaryl group is capable of assuming the paraquinoid form. Now in my present invention I claim a special class of these new dyes which derive from those of such 4-hydroxydiarylamins in which the ore aryl residue is a phenyl group and the other aryl residue is a naphthyl group and in which one of the two 4-positions contains a hydroxyl group, or from their derivatives containing in the benzene or in the naphthalene nucleus further suitable univalent substituents, such as a halogen, an alkyl or alkoxy group, a carboxylic group, etc., the sulfonic group being excepted.

In producing the new sulfur dyes according to this invention I can also use as parent material the corresponding thio compounds, *i. e.*, the corresponding derivatives of a thiophenylnaphthylamin, thus for instance instead of 4-hydroxyphenyl-1-naphthylamin I may employ the 4-hydroxy-thiophenyl-1-naphthylamin.

The parent materials of my present invention therefore possess the following nucleus:

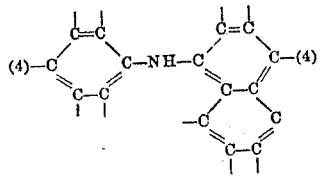

in which diagram the figures (4) represent the two 4-positions of the diarylamin.

The following examples may serve to illustrate my invention, the parts being by weight:

(1.) 50 parts of 4-hydroxyphenyl-1-naphthylamin and 40 parts of sulfur are melted together; the mixture is then heated to about 220–240° C. during about 4–8 hours; thus a dye is obtained which produces on cotton without a mordant in a bath containing an alkali sulfid dull blue tints which are very fast to washing and show a very remarkable fastness to chlorin.

(2.) 50 parts of 4-hydroxyphenyl-1-naphthylamin are melted with 50 parts of sulfur, the temperature being then gradually raised to 200° C. This temperature is maintained for about 8 hours; the temperature is then raised to about 240–250° C. and maintained at this point for about 4 hours. The product of this operation dyes cotton without a mordant intense blue-gray tints of good fastness to washing and remarkable fastness to chlorin. If in the foregoing example, the temperature is raised only to 200° C. a dye is obtained which produces tints that are more violet-gray but also show a remarkable fastness to chlorin.

(3.) 40 parts of sulfur and 50 parts of 4-hydroxyphenyl-2-naphthylamin are melted together and the mass is then heated to about 220–240° C. during about 4–8 hours. The dye thus obtained produces on unmordanted cotton from a dye-bath containing an alkali sulfid violet-black shades which possess an excellent fastness to washing and which are fast to chlorin.

(4.) 28 parts of 4-hydroxy-3-carboxyphenyl-2-naphthylamin, 10 parts of soda-lye 43° Bé., 100 parts of crystallized sodium sulfid and 80 parts of sulfur are heated to the boil, using a reflux condenser, in an oil bath during about 20–40 hours. The dye thus produced may be isolated in the known manner; it produces on cotton with the aid of alkali polysulfids a black tint fast to washing.

The new dyes derived from a 4-hydroxyphenylnaphthylamin and obtained as above are in the dry state when pulverized, generally speaking, black powders, practically insoluble in alcohol, glacial acetic acid, benzene, nitrobenzene and chloro-benzene; they are soluble in anilin and pyridin, generally speaking, to a violet solution and they dissolve in concentrated sulfuric acid, generally speaking, to a green to blue solution and in 25% fuming sulfuric acid, generally speaking, to blue to violet solutions which solutions are gradually decolorized on the addition of aluminium powder.

It is obvious to those skilled in the art that my present invention is not limited to the foregoing examples or to the details given therein. Thus for instance instead of the parent materials above used 4-hydroxy-3-carboxyphenyl-2-naphthylamin may be heated with sulfur alone yielding thus a black dye fast to chlorin. Furthermore other 4-hydroxydiarylamins, such as for instance 4-hydroxynaphthyl-1-phenylamin or the like may be sulfurized according to my present invention.

It may also be stated that the proportions of the ingredients as well as the temperature of reaction or the duration of heating may be altered within wide limits without departing from the scope of my present invention.

Having now described my invention and the manner in which it may be performed, what I claim is—

1. The manufacture of new sulfurized dyes fast to washing and to chlorin by acting with a sulfurizing agent upon those 4-hydroxydiarylamins in which one aryl residue is a phenyl group and the other aryl residue is a naphthyl group and in which one of the two 4-positions contains a hydroxyl group, which parent materials contain no sulfonic group and possess the following nucleus:

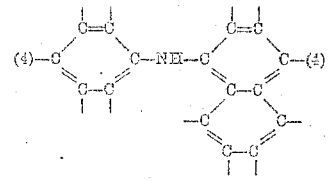

in which diagram the figures (4) represent the two 4-positions referred to.

2. The manufacture of new sulfurized dyes fast to washing and to chlorin by acting with sulfur upon those 4-hydroxydiarylamins in which one aryl residue is a phenyl group and the other aryl residue is a naphthyl group, and in which one of the two 4-positions contains a hydroxyl group, which parent materials contain no sulfonic group and possess the following nucleus:

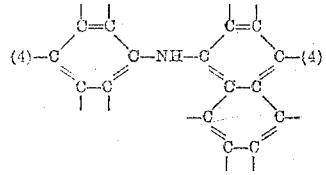

in which diagram the figures (4) represent the two 4-positions referred to.

3. The manufacture of new sulfurized dyes fast to washing and to chlorin by acting with sulfur in the presence of a substance being a liquid at the temperatures in question upon those 4-hydroxydiarylamins in which one aryl residue is a phenyl group and the other aryl residue is a naphthyl group and in which one of the two 4-positions contains a hydroxyl group, which parent materials contain no sulfonic group and possess the following nucleus:

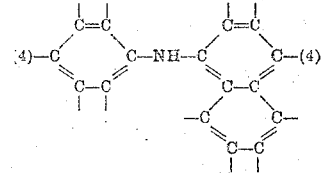

in which diagram the figures (4) represent the two 4-positions referred to.

4. The manufacture of new sulfurized dyes fast to washing and to chlorin by acting with a sulfurizing agent upon 4-hydroxyphenyl-1-naphthylamin.

5. The manufacture of a new sulfurized dye fast to washing and to chlorin by acting with sulfur upon 4-hydroxyphenyl-1-naphthylamin.

6. As new articles of manufacture new sulfurized dyes fast to washing and to chlorin derived from a 4-hydroxydiarylamin in which the one aryl residue is a phenyl group and the other aryl residue is a naphthyl group and in which one of the two 4-positions contains a hydroxy group, which parent materials contain no sulfonic group and possess the following nucleus:

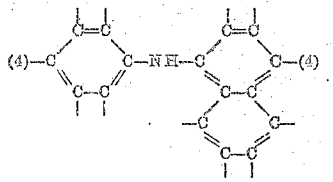

in which diagram the figures (4) represent the two 4-positions referred to, which new dyes are practically insoluble in alcohol, glacial acetic acid, benzene, nitrobenzene and chlorobenzene, and which new dyes are soluble in anilin and pyridin and dissolve in concentrated sulfuric acid and in 25% fuming sulfuric acid to intensely colored solutions, and which new dyes produce on unmordanted cotton from a dye-bath containing an alkali sulfid, generally speaking, blue to black tints fast to washing and to chlorin, and which new dyes are also capable of being dyed from a hydrosulfite vat, yielding, generally speaking, a yellow vat, from which cotton is dyed blue to black tints.

7. As new articles of manufacture new sulfurized dyes derived from a 4-hydroxyphenylnaphthylamin, not containing a sulfonic group, which new dyes in the dry state when pulverized, generally speaking, are black powders, which new dyes are practically insoluble in alcohol, glacial acetic acid, benzene, nitrobenzene and chlorobenzene, and which new dyes are soluble in anilin, and pyridin, generally speaking, to a violet solution, and these new dyes dissolving in concentrated sulfuric acid, generally speaking, to a green to blue solution, which remains unaltered on the addition of boric acid but is gradually decolorized by the addition of aluminium powder, and which new dyes dissolve in 25% fuming sulfuric acid, generally speaking, to blue to violet solutions which solutions remain unaltered on the addition of boric acid but are gradually decolorized by the addition of aluminium powder, and which new dyes produce on unmordanted cotton from a dye-bath containing an alkali sulfid, generally speaking, blue to black tints fast to washing and to chlorin, and which new dyes are also capable of being dyed from a hydrosulfite vat, yielding a yellow vat, from which cotton is dyed blue to black tints.

8. As a new article of manufacture a new sulfurized dye which may be obtained by acting with sulfur upon 4-hydroxyphenyl-1-naphthylamin, which new dye in the dry state when pulverized is a black powder which is practically insoluble in alcohol, glacial acetic acid, benzene, nitrobenzene and chlorobenzene, and which new dye is soluble in anilin and pyridin to a violet solution, this new dye dissolving in concentrated sulfuric acid to a green-blue solution which remains unaltered on the addition of boric acid but is gradually decolorized by the addition of aluminium powder, and which new dye dissolves in 25% fuming sulfuric acid to a violet-blue solution which solution remains unaltered on the addition of boric acid but is gradually decolorized by the addition of aluminium powder, and which new dye produces from a dye-bath containing an alkali sulfid a dull blue tint fast to washing and to chlorin, this new dye being also capable of dyeing from a hydrosulfite vat yielding a yellow vat, from which cotton is dyed a dull blue tint.

In testimony whereof I have signed my name to this specification in the presence of two subscribing witnesses.

HEINRICH HEIMANN.

Witnesses:
 RUDOLPH FRICKE,
 DORIS KRAHL.